US012220924B2

(12) United States Patent
Uyama et al.

(10) Patent No.: US 12,220,924 B2
(45) Date of Patent: Feb. 11, 2025

(54) LIQUID EJECTION APPARATUS AND LIQUID TANK

(71) Applicant: CANON KABUSHIKI KAISHA, Tokyo (JP)

(72) Inventors: Masaya Uyama, Kanagawa (JP); Souta Takeuchi, Kanagawa (JP); Takumi Shimoda, Kanagawa (JP)

(73) Assignee: Canon Kabishiki Kaisha, Tokyo (JP)

( * ) Notice: Subject to any disclaimer, the term of this patent is extended or adjusted under 35 U.S.C. 154(b) by 0 days.

(21) Appl. No.: 17/974,479

(22) Filed: Oct. 26, 2022

(65) Prior Publication Data

US 2023/0050852 A1 Feb. 16, 2023

Related U.S. Application Data

(63) Continuation of application No. 17/154,720, filed on Jan. 21, 2021, now Pat. No. 11,511,548.

(30) Foreign Application Priority Data

Jan. 31, 2020 (JP) ................................. 2020-014824

(51) Int. Cl.
*B41J 2/175* (2006.01)

(52) U.S. Cl.
CPC .. *B41J 2/17566* (2013.01); *B41J 2002/17573* (2013.01)

(58) Field of Classification Search
CPC .................... B41J 2/17566; B41J 2002/17573
See application file for complete search history.

(56) References Cited

U.S. PATENT DOCUMENTS

| | | | | |
|---|---|---|---|---|
| 5,616,929 | A | 4/1997 | Hara | |
| 10,350,896 | B2 | 7/2019 | Ishizawa et al. | |
| 11,331,928 | B2 * | 5/2022 | Katahira | B41J 29/38 |
| 11,511,548 | B2 * | 11/2022 | Uyama | B41J 2/17513 |
| 2002/0134829 | A1 | 9/2002 | Tanaka | |
| 2003/0218651 | A1 | 11/2003 | Fukano et al. | |
| 2005/0185035 | A1 | 8/2005 | Takei | |
| 2008/0273047 | A1 | 11/2008 | Kawarazuka et al. | |
| 2015/0352853 | A1 | 12/2015 | Kudo et al. | |
| 2017/0151818 | A1 * | 6/2017 | Ishibe | B41J 2/17566 |

(Continued)

FOREIGN PATENT DOCUMENTS

| | | |
|---|---|---|
| CN | 1452035 | 10/2003 |
| CN | 101192022 | 6/2008 |

(Continued)

OTHER PUBLICATIONS

Office Action dated Sep. 26, 2022 in counterpart Chinese Application No. 202110101090.3, together with English translation thereof.

(Continued)

*Primary Examiner* — Sharon Polk
(74) *Attorney, Agent, or Firm* — Vemable LLP

(57) ABSTRACT

A liquid ejection apparatus includes a housing provided at least with an upper surface and side surfaces, and a liquid tank that is arranged in the housing and is refillable with a liquid from outside. A display unit that indicates a remaining liquid amount in the liquid tank is arranged at least at one of joining portions each joining the upper surface to one of the side surfaces.

14 Claims, 11 Drawing Sheets

(56) References Cited

U.S. PATENT DOCUMENTS

| | | | |
|---|---|---|---|
| 2017/0157942 A1 | 6/2017 | Koganehira et al. | |
| 2017/0274663 A1 | 9/2017 | Kanaya et al. | |
| 2017/0326882 A1 | 11/2017 | Okude et al. | |
| 2018/0117927 A1 | 5/2018 | Moriyama et al. | |
| 2019/0009569 A1 | 1/2019 | Kudo et al. | |
| 2019/0092037 A1 | 3/2019 | Murata | |
| 2019/0100024 A1 | 4/2019 | Yamada et al. | |
| 2022/0043390 A1* | 2/2022 | Wong | B41J 29/02 |

FOREIGN PATENT DOCUMENTS

| | | |
|---|---|---|
| CN | 101254707 | 9/2008 |
| CN | 103935130 | 7/2014 |
| CN | 106794699 | 5/2017 |
| CN | 107081963 | 8/2017 |
| CN | 108698410 | 10/2018 |
| CN | 109572221 | 4/2019 |
| JP | 2004-042279 | 2/2004 |
| JP | 2008-105333 | 5/2008 |
| JP | 2013-216035 | 10/2013 |
| JP | 2017-185747 | 10/2017 |
| JP | 2018-069513 | 5/2018 |
| JP | 2018-144281 | 9/2018 |
| JP | 2019-142116 | 8/2019 |
| JP | 2019-177565 | 10/2019 |
| JP | 2021-008106 | 1/2021 |
| WO | 01/61459 | 8/2001 |

OTHER PUBLICATIONS

Office Action dated Feb. 22, 2023 in counterpart Chinese Application No. 202110101090.3, together with English translation thereof.

Office Action dated Jan. 30, 2024 in counterpart Japanese Application No. 2020-014824, together with English translation thereof.

Office Action dated Nov. 23, 2023 in counterpart Japanese Application No. 2020-014824, together with English translation thereof.

* cited by examiner

LIQUID EJECTION APPARATUS AND LIQUID TANK

This application is a continuation of application Ser. No. 17/154,720 filed Jan. 21, 2021, currently pending; and claims priority under 35 U.S.C. § 119 to Japan Application No. 2020-014824 filed in Japan on Jan. 31, 2020; and the contents of all of which are incorporated herein by reference as if set forth in full.

BACKGROUND OF THE DISCLOSURE

Field of the Disclosure

This disclosure relates to a liquid ejection apparatus and a liquid tank.

Description of the Related Art

A liquid ejection apparatus is provided with a liquid tank that stores a liquid, and the liquid is supplied from the liquid tank to a liquid ejection head. There are mainly two types of the liquid tank for the liquid ejection apparatus, namely, a cartridge type and a liquid refill type. The liquid tank of the cartridge type is replaced on the cartridge basis in a case where a remaining liquid amount is little (or in a case where the liquid is depleted). On the other hand, in the case of the liquid tank of the liquid refill type, the liquid tank is refilled with the liquid and is used continuously if the remaining amount of the liquid is reduced.

Japanese Patent Laid-Open No. 2018-144281 (hereinafter referred to as Reference 1) discloses a liquid ejection apparatus which includes a liquid tank of a liquid refill type. The liquid ejection apparatus that adopts the liquid tank of the liquid refill type is required to enable a user to easily recognize a remaining liquid amount so as to determine a timing for liquid refilling. In the case of the liquid ejection apparatus disclosed in Reference 1, a window is formed at a lower part of a front surface of the apparatus at a position opposed to the liquid tank in the apparatus as shown in FIGS. 1 and 2 of Reference 1. A user can recognize the remaining amount of the liquid in the liquid tank formed from of a transparent component through this window.

In the liquid ejection apparatus of Reference 1, the remaining amount display is provided at the lower part of the liquid ejection apparatus. This may complicate the recognition of the remaining amount in the liquid tank by the user in some cases. In the meantime, this liquid ejection apparatus is inconvenient because the user has to look into the liquid ejection apparatus from a lateral side in order to accurately confirm the remaining liquid amount.

SUMMARY OF THE DISCLOSURE

A liquid ejection apparatus according to an aspect of this disclosure provides a liquid ejection apparatus which includes: a housing at least provided with an upper surface and side surfaces; a liquid tank being arranged in the housing and being refillable with a liquid from outside; and a display unit which indicates a remaining liquid amount in the liquid tank, and is arranged at least at one of joining portions each joining the upper surface to one of the side surfaces.

Further features of the present disclosure will become apparent from the following description of exemplary embodiments with reference to the attached drawings.

DESCRIPTION OF THE EMBODIMENTS

Figure 1:
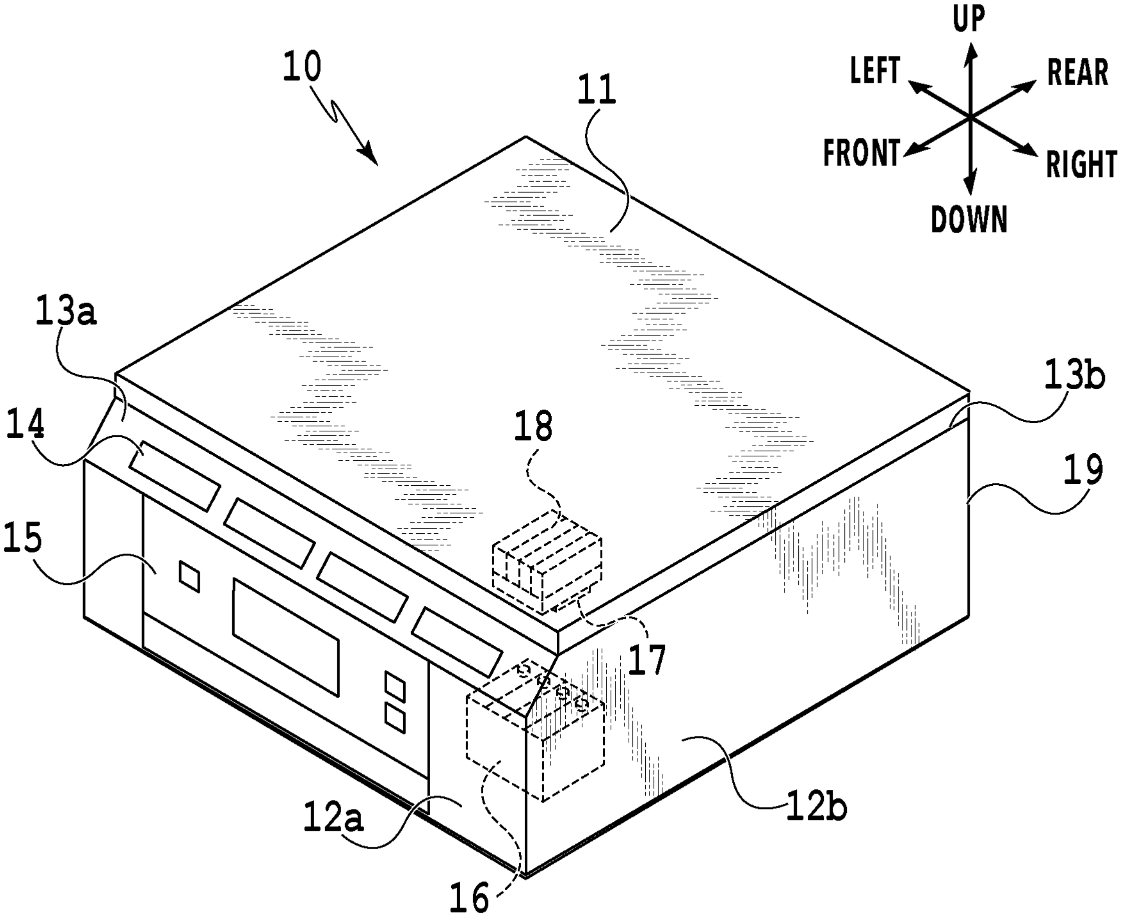
FIG. 1 is a schematic perspective view showing a liquid ejection apparatus.

Embodiments of this disclosure will be described below with reference to the drawings. In the following description, the same constituents will be denoted by the same reference numerals. It is to be also noted that relative arrangements, shapes, and so forth of the constituents described in the embodiments are mere examples. In this specification, reference numerals suffixed with alphabets will represent reference to individual structures while an item in common may be expressed by the reference numeral without suffixed alphabets as appropriate.

First Embodiment

FIG. 1 is a schematic perspective view showing an example of a liquid ejection apparatus 10 of this embodiment. The liquid ejection apparatus 10 of this embodiment is a printing apparatus. The liquid ejection apparatus 10 is an apparatus configured to eject inks which are liquids. The liquid ejection apparatus 10 is refillable with the liquids from outside. The liquid ejection apparatus 10 includes a liquid ejection head 17, a carriage 18 that mounts the liquid ejection head 17, liquid tanks 16, and a housing 19.

The liquid tanks 16 are provided near a front right part of the liquid ejection apparatus 10. Note that front-rear, right-left, and upper-lower directions stated in this specification are assumed to be directions indicated in the respective drawings. FIG. 1 shows an aspect of the liquid ejection apparatus 10 in use, in which an upper direction is equivalent to an upward direction in a direction of gravitational force, a lower direction is equivalent to a downward direction in the direction of the gravitational force, and right-left and front-rear directions are equivalent to horizontal directions. The liquid ejection apparatus 10 includes a not-illustrated cover used for refilling the liquid tanks. A user can refill each liquid tank 16 with a liquid by opening the refilling cover and inserting an ink bottle into the liquid tank 16.

The carriage 18 is movable to the right and left inside the housing 19. The carriage 18 scans a print medium such as paper placed below the carriage 18 in the direction of the gravitational force in the right and left directions while ejecting liquids, thereby forming an image on the print medium. The image is printed on a sheet surface by repeating the scanning and liquid ejection with the carriage 18 while feeding the paper. Sub ink tanks for temporarily storing inks may be installed in the carriage 18.

A not-illustrated paper feed tray is provided to the housing 19. The user opens the paper feed tray and sets the paper so as to feed the paper. The paper is sent below the carriage 18 and subjected to printing. The paper with the printed image is then discharged.

The carriage 18 is connected to the liquid tanks 16 with not-illustrated tubes or the like, and the inks are supplied from the liquid tanks 16 to the carriage 18. Each tube has a sufficient length and is designed such that a joining portion with the tube as well as the tube itself are kept from damage while the carriage 18 performs the scanning to the right and left.

The housing 19 includes an upper surface 11 and side surfaces 12 (12*a* and 12*b*). The side surface 12 is a surface constituting part of the housing 19, which is joined to the upper surface 11 constituting part of the housing 19 either directly or indirectly through an arbitrary component. The side surface 12 may be a side surface (a front surface 12*a*) on which an operating panel 15 and the like of the liquid ejection apparatus 10 are arranged, a rear surface (not shown) on an opposite side of the front surface, or any of side surfaces 12*b* located on the right and left in view from the front surface.

In the liquid ejection apparatus 10 of this embodiment, sides that join the upper surface 11 to the side surfaces 12 either directly or indirectly through an arbitrary component will be referred to as joining portions 13 (13*a* and 13*b*). Moreover, in the liquid ejection apparatus 10 of this embodiment, display units 14 indicating remaining liquid amounts are arranged at one of the joining portions 13. In other words, the display units 14 indicating the remaining liquid amounts are arranged in a region where upper surface 11 is joined to one of the side surfaces 12. In the example of FIG. 1, the display units 14 are arranged at the joining portion 13*a* formed from the front surface 12*a* and the upper surface 11. Here, the display units 14 only need to be arranged in the region where at least the upper surface 11 is joined to the side surface 12, and the display units 14 may be arranged in such a way as to extend on at least one of the upper surface 11 and the side surface 12. Arrangement of the display units 14 indicating the remaining liquid amounts on the joining portion 13 enables the user to recognize the remaining liquid amounts in the liquid tanks 16 easily. In other words, in the example of FIG. 1, the user can recognize the remaining liquid amounts in the liquid tanks 16 by using the display units 14 from the front surface side, the upper surface side, or the right or left side surface side of the liquid ejection apparatus 10. In general, the liquid ejection apparatus 10 is installed on a given base or the like in such a way as to be located below the eye level of the user because the user operates the operating panel 15 or the like and sets print media into the liquid ejection apparatus 10. Accordingly, the user can easily recognize the remaining liquid amounts in the liquid tanks 16 by arranging the display units 14 at least in the region where the upper surface 11 is joined to the side surface 12.

Here, the display units 14 may be arranged not only on the joining portion 13*a* formed from the upper surface 11 and the front surface 12*a* but also on a joining portion 13*b* formed from the upper surface 11 and the right or left side surface 12*b*. Meanwhile, the display units 14 may be arranged at a joining portion (not shown) formed from the upper surface 11 and the rear surface (not shown). By arranging the display units 14 in a region corresponding to the side where the upper surface 11 of the housing 19 is joined to the side surface 12 thereof (such as a region across an upper part of the joining portion 13*b* and the side surface 12*b*) as described above, the user can recognize the remaining liquid amounts in the liquid tanks 16 from a wide angle. Note that the joining portion 13*b* is provided on the extension of the side surface 12*b* (within a plane defined by extending the side surface 12*b*) in FIG. 1. Although the display units 14 may be provided on the joining portion 13*b*, it is preferable from the viewpoint of visibility from above in particular to provide the display units 14 on a surface such as the joining portion 13*a*, which is inclined relative to a vertical direction.

As mentioned above, in the liquid ejection apparatus 10 shown in FIG. 1, the joining portion 13*a* is the surface inclined relative to the vertical direction, or in other words, a region formed by chamfering a peak defined by the upper surface 11 and the front surface 12*a*. Then, the display units 14 are arranged in the chamfered region. Specifically, in the housing 19, the upper surface 11 is joined to the front surface 12*a* through the intermediary of the joining portion 13*a* formed by chamfering the peak defined by the upper surface 11 and the front surface 12*a*. However, the joining portion 13 is not limited only to this example. Depending on the design of the liquid ejection apparatus 10, the peak defined by the upper surface 11 and the front surface 12*a* may be provided as the joining portion and the display units 14 may be arranged at the joining portion. In the meantime, the joining portion (the display units 14) may be formed into a curved surface.

In general, the liquid ejection apparatus 10 often handles multiple kinds of liquids such as cyan, magenta, yellow, and black liquids. In this case, the display units 14 for the remaining liquid amounts corresponding to the respective colors are provided. FIG. 1 shows an example of the liquid ejection apparatus 10 provided with the display units 14 for the remaining amounts of the liquids in four colors. The display units 14 for all the colors may be provided at the joining portion 13*a* on a certain side or the display units of the respective colors may be provided in a dispersed manner on the joining portions of two or more sides.

Meanwhile, in the case of arranging the display units 14 on the joining portion 13*b* and if the upper surface of the liquid ejection apparatus 10 is equipped with a scanner or the like, a joining portion between the upper surface and the side surface may be defined as an edge of a lid of the scanner and the display units 14 may be arranged thereon. Specifically, the display units 14 may be arranged at the lid of the scanner which is movable during an operation thereof. Alternatively, the display units 14 may be arranged at an edge serving as an axis to open and close the lid.

Figure 2A:
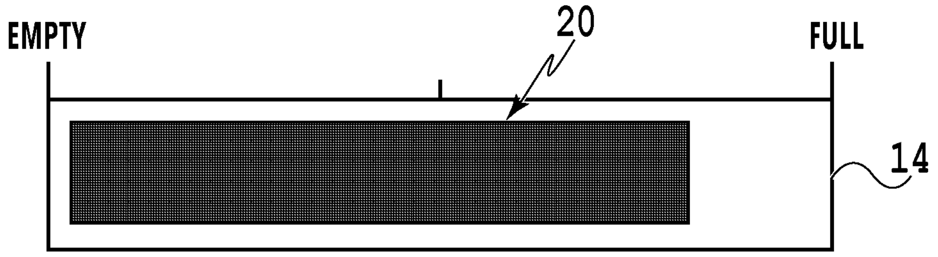
FIGS. 2A and 2B are diagrams showing an example of a display unit.
Figure 2B:
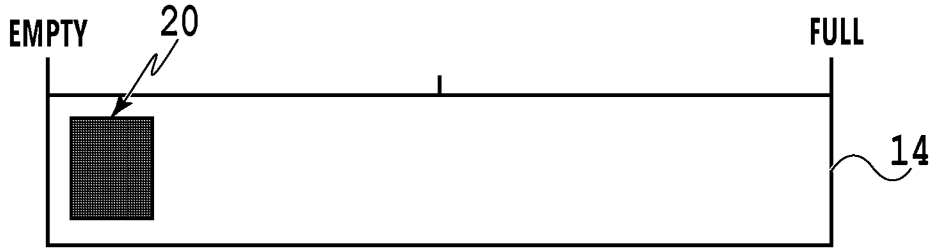

FIGS. 2A and 2B are diagrams showing an example of the display unit 14. As shown in FIGS. 1 to 2B, the display unit 14 is preferably displayed in such a way that the magnitude of the remaining amount is visually recognizable by using a scale in a lateral direction (which corresponds to the right-left direction in FIG. 1). FIG. 2A shows the display unit 14 in the case where the remaining liquid amount in the liquid tank 16 is relatively large. FIG. 2B shows the display unit 14 in the case where the remaining liquid amount in the liquid tank 16 is relatively small. The joining portion 13 is formed along the upper surface 11 and the side surface 12 of the housing 19. Accordingly, it is possible to provide a display area that facilitates visual recognition of the remaining amounts by arranging the display units 14 on the joining portion 13 in the direction of extension (the right-left direction in FIG. 1) of the joining portion 13 where the upper surface 11 is joined to the side surface 12. FIG. 2 shows an example of the display unit 14 in which a length of an indicator that indicates the remaining amount varies in the direction of extension of the joining portion in accordance with the remaining amount in the liquid tank 16.

As for a display method applicable to the display unit 14, a meter indicating the remaining amount may be increased or decreased by light emission using LEDs or the like. Alternatively, a float may be arranged in the liquid tank 16 and a level of a liquid surface may be detected and the amount of the liquid may be displayed accordingly. Meanwhile, in the case where two or more liquid tanks 16 are provided, the display units 14 may be used as remaining amount meters according to the colors of the liquids.

FIG. 1 has described the example in which the display units 14 for the liquids of four colors are provided to the joining portion 13*a* where the front surface 12*a* is joined to the upper surface 11. Here, the display units 14 only need to be provided to at least one location out of the joining portions 13 that join the upper surface 11 to the side surfaces 12. In other words, the display units 14 may be provided to the joining portions 13 at two or more locations. For instance, the display units 14 for two colors may be provided to the joining portion 13*a* and to the joining portion 13*b* between the upper surface 11 and the side surface 12*b*, respectively.

Although this embodiment is applicable to the liquid ejection apparatus including the liquid tanks of the cartridge type, it is more effective if this embodiment is applied to the liquid ejection apparatus 10 including the liquid tanks 16 of the liquid refill type. In the case where the liquid tanks in the liquid ejection apparatus are of the cartridge type, the user who uses this liquid ejection apparatus prepares a new cartridge in a case where the liquid in one of the cartridges is about to run out, for example, and replaces the cartridge after the liquid actually runs out. On the other hand, in the case where the liquid tanks are of the refill type, the user can refill each tank with the corresponding liquid every time the liquid is about to run out. In this regard, the configuration that facilitates the visual recognition of the remaining liquid amounts is more advantageous for the user in the case of the liquid ejection apparatus 10 that includes the refillable liquid tanks 16 in particular.

Although this embodiment has described an example in which no windows used to observe the remaining liquid amounts in the liquid tanks 16 are formed in the housing 19, such windows used to observe the remaining liquid amounts in the liquid tanks 16 may be formed instead. Meanwhile, in the case where the liquid tanks 16 are housed in a tank housing unit (not shown) fixed to the housing 19, the above-mentioned windows may be provided to the tank housing unit.

As described above, in this embodiment, the display units 14 for the remaining liquid amounts are arranged at the joining portion 13 where the upper surface 11 and the side surface 12 of the housing 19 are joined to each other. Accordingly, the display units for the remaining liquid amounts can be recognized from a lateral direction (from the right or the left), from above, and from an oblique direction of the housing 19, thus enabling the user to confirm the remaining liquid amounts easily.

Second Embodiment

The first embodiment has described the example of providing the display units for displaying the remaining amounts in the liquid tanks to the joining portion where the upper surface of the housing is joined to the side surface thereof. This embodiment will describe an example of providing a structure to enable visual recognition of a remaining amount in a liquid tank to two or more surfaces of a housing. Note that this embodiment will describe an example of confirming a remaining amount of a liquid by causing a user to visually check a level of a liquid surface in the liquid tank without relying on a liquid surface sensor and the like.

Figure 3:
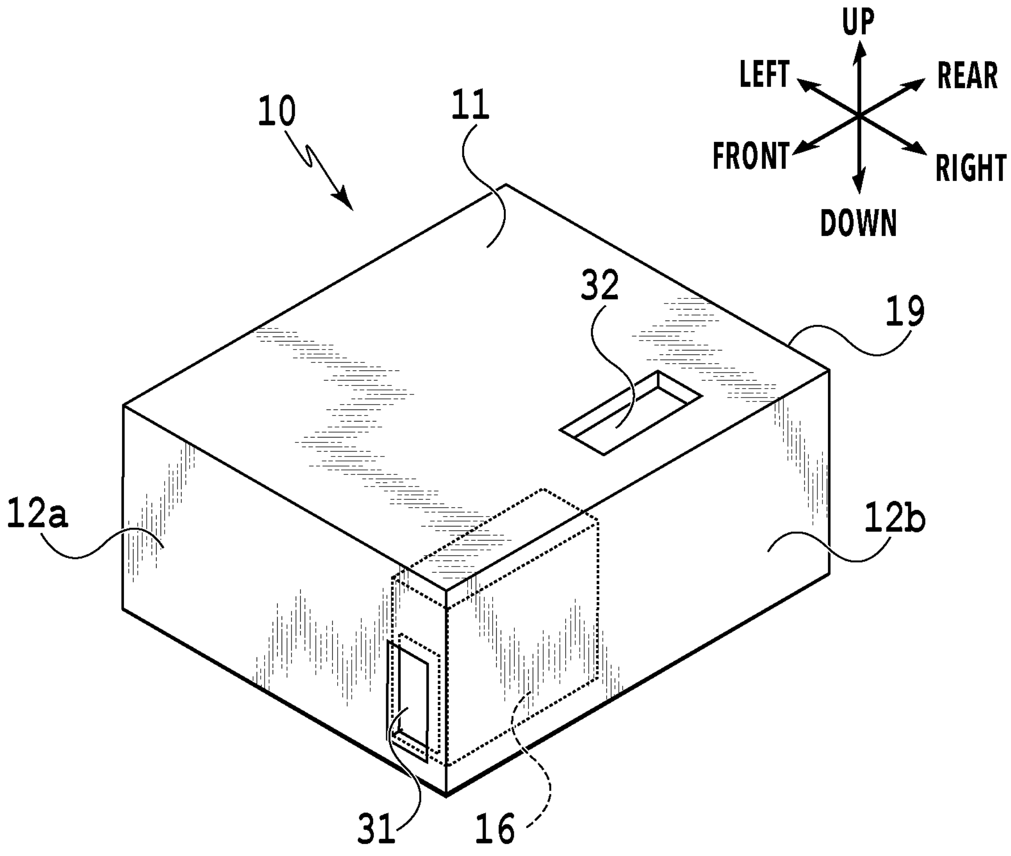
FIG. 3 is a schematic perspective view showing a liquid ejection apparatus.

FIG. 3 is a schematic perspective view showing the liquid ejection apparatus 10 of this embodiment. The liquid ejection apparatus 10 of this embodiment also includes the housing 19 as with the example described in the first embodiment. The housing 19 includes the upper surface 11 and the side surfaces 12 (12*a* and 12*b*). The housing 19 is formed substantially into a rectangular parallelepiped shape as a whole. The liquid tank 16 is provided inside the housing. The liquid tank 16 is formed substantially into a rectangular parallelepiped shape as a whole. Here, the liquid ejection apparatus 10 may include the liquid ejection head, an operating unit, and the like as described in the first embodiment. However, these components are not illustrated in FIG. 3 for the purpose of simplifying the description.

In the liquid ejection apparatus 10 of this embodiment, a front surface observation window 31 (an opening) for checking the remaining amount in the liquid tank 16 is formed in the front surface 12*a* of the housing 19. The front surface 12*a* can be defined as the surface where the not-illustrated operating unit and the like are provided. In addition, an upper surface observation window 32 for checking the remaining amount in the liquid tank 16 is also formed in the upper surface 11 of the housing 19.

Figure 4:
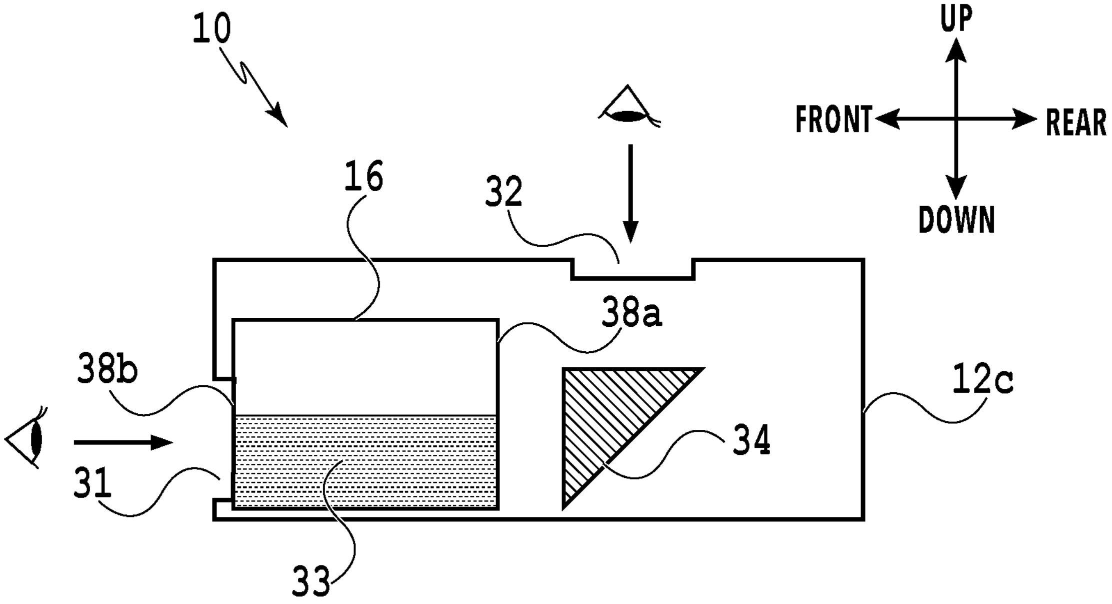
FIG. 4 is a cross-sectional view of the liquid ejection apparatus.

FIG. 4 is a cross-sectional view of the liquid ejection apparatus 10 in FIG. 3, which shows an example of sectioning the liquid ejection apparatus 10 along a plane that passes through the liquid tank 16, and front surface observation window 31, and the upper surface observation window 32 in FIG. 3. A predetermined volume of a liquid 33 is contained in an internal space of the liquid tank 16. Of surfaces that constitute the liquid tank 16, at least two surfaces (a surface 38*a* and a surface 38*b*) being parallel to the front surface 12*a* of the liquid ejection apparatus 10 are made of transparent components having optical transparency, for example. Specifically, the liquid tank 16 is formed in such a way that a level of a liquid surface of the liquid 33 inside the liquid tank 16 is visually recognizable through these two surfaces.

The liquid tank 16 is arranged at a position inside the liquid ejection apparatus 10, which is opposed to the front surface observation window 31. Specifically, the front surface observation window 31 of the liquid ejection apparatus 10 is provided at a position corresponding to a front surface of the liquid tank 16 which is arranged in the liquid ejection apparatus. The user can visually recognize the level of the liquid surface of the liquid 33 contained in the liquid tank 16 through the front surface observation window 31.

Moreover, in the liquid ejection apparatus 10, a light reflection member 34 formed from a right angle prism, for example, is installed between the liquid tank 16 and a rear surface 12*c* of the liquid ejection apparatus 10. The light reflection member 34 is installed in such a way as to be located on the extension of a line of sight in a case where the user looks into the upper surface observation window 32. In other words, the light reflection member 34 is provides at such a position that covers a point of intersection of a line of sight through the front surface observation window 31 of the liquid ejection apparatus 10 with the line of sight through the upper surface observation window 32 thereof.

The user can observe a surface (the surface 38*a*) formed from the transparent component of the liquid tank 16 through the light reflection member 34 by looking into the liquid ejection apparatus 10 from the upper surface observation window 32. As a consequence, the user can also visually recognize the level of the liquid surface of the liquid 33 by observing the liquid ejection apparatus 10 through the upper surface observation window 32 as well.

As described above, this embodiment is provided with a visual recognition mechanism which enables the user to visually recognize the level of the liquid surface indicating the remaining liquid amount in the liquid tank 16 from the front surface and the upper surface, respectively. As discussed earlier, the visual recognition mechanism includes the front surface observation window 31, the upper surface observation window 32, and the light reflection member 34. Provision of the visual recognition mechanism enables the user to observe the remaining amount in the liquid tank 16 from the surface other than the front surface of the liquid ejection apparatus 10. In other words, the user can observe the remaining amount in the liquid tank 16 from two or more surfaces of the liquid ejection apparatus 10. As a consequence, the user can observe the remaining amount in the liquid tank 16 without looking into the front surface of the liquid ejection apparatus 10 from the lateral direction thereof.

Here, the surfaces 38*a* and 38*b* of the liquid tank 16 do not always have to be entirely formed from the transparent component. Instead, at least part of each of the surfaces 38*a* and 38*b* needs to be formed from the transparent component. For example, the region corresponding to the light reflection member 34 may be formed from the transparent component. Meanwhile, inside the liquid ejection apparatus 10, spaces with no shielding members are formed between the upper surface observation window 32 and the light reflection member 34 and between the surface 38*a* of the liquid tank 16 and the light reflection member 34. Each of the front surface observation window 31 and the upper surface observation window 32 may be a simple opening or a light-transmissive transparent component may be fitted into such an opening. Meanwhile, the front surface observation window 31 may be integrated with the liquid tank 16.

Figure 5:
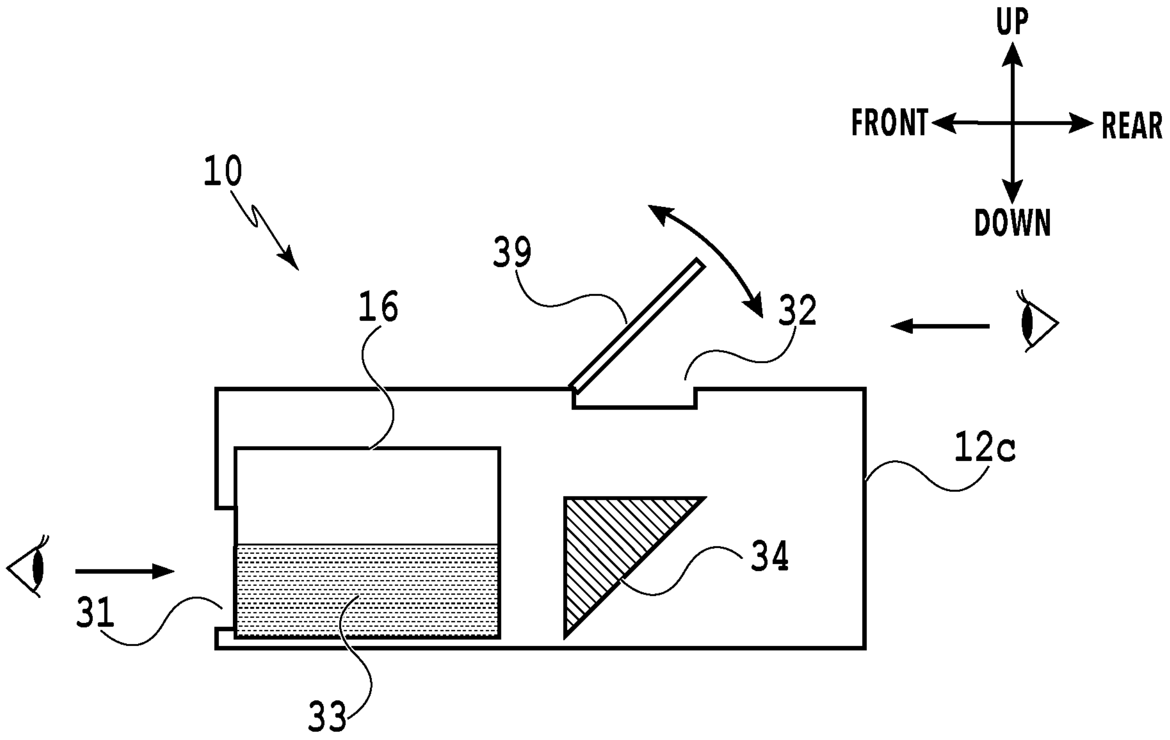
FIG. 5 is a diagram showing an example of providing a variable angle mirror.

FIG. 5 shows an example of providing a variable angle mirror 39 to the structure shown in FIG. 4. As shown in FIG. 5, attachment of the variable angle mirror 39 to one of four sides of the upper surface observation window 32 enables the user to visually recognize the remaining amount of the liquid 33 from directions other than the direction from above. Depending on the position on the four sides of the upper surface observation window 32 to attach the variable angle mirror 39, the user can visually recognize the remaining amount of the liquid 33 from the right or left side or from the rear surface side as well. Moreover, an angle of the variable angle mirror 39 is adjustable so that the user can observe the remaining amount of the liquid 33 by changing this angle while maintaining the comfortable posture for the observation.

FIGS. 3 to 5 have described the example of providing the front surface observation window 31 and the upper surface observation window 32. However, the front surface observation window 31 need not be provided. Specifically, the liquid ejection apparatus 10 only needs to be configured such that the remaining amount of the liquid 33 in the liquid tank 16 can be observed from the surface other than the front surface 12*a* thereof.

Third Embodiment

The second embodiment has described the example of the liquid ejection apparatus provided with the light reflection member 34. This embodiment will describe an example in which the user can check the remaining liquid amount from two or more surfaces of the liquid ejection apparatus 10 without using the light reflection member 34.

Figure 6:
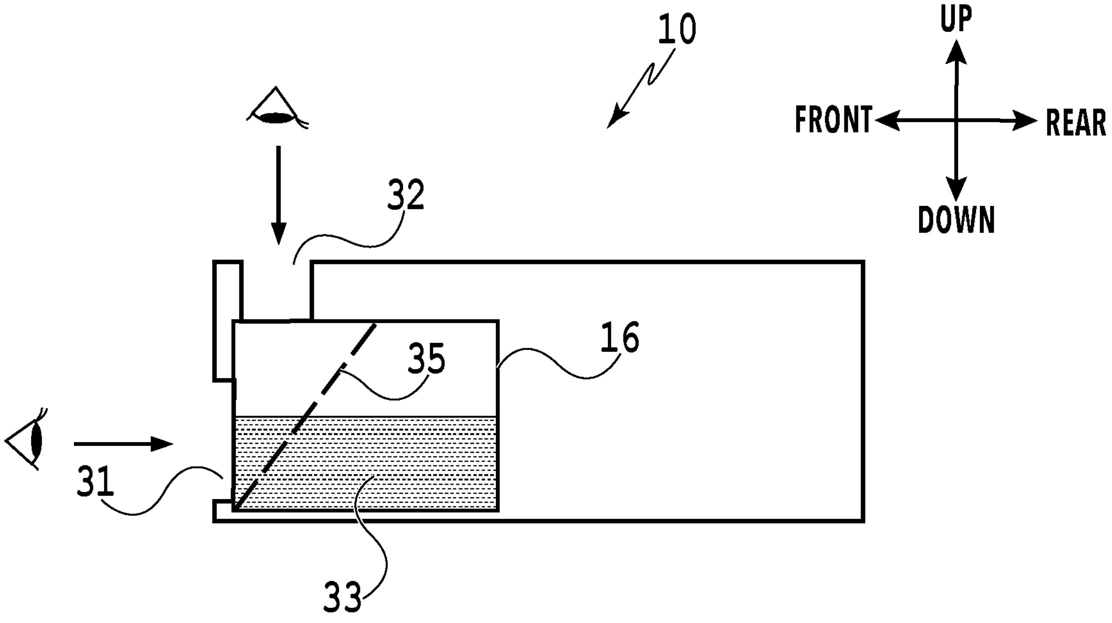
FIG. 6 is a cross-sectional view of a liquid ejection apparatus.
Figure 7:
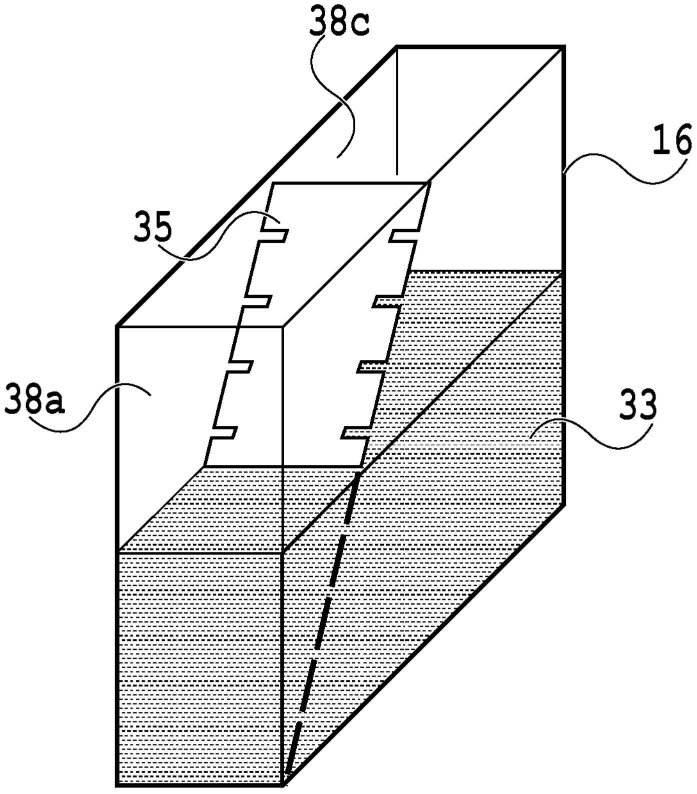
FIG. 7 is a schematic diagram of a liquid tank.

FIG. 6 is a cross-sectional view of the liquid ejection apparatus 10 in FIG. 3, which shows an example of sectioning the liquid ejection apparatus 10 along the plane that passes through the liquid tank 16, the front surface observation window 31, and the upper surface observation window 32 in FIG. 3. FIG. 7 shows a schematic diagram of the liquid tank 16 in this embodiment.

As shown in FIGS. 6 and 7, a predetermined volume of the liquid 33 is contained in the liquid tank 16 of this embodiment. The liquid tank 16 can be arranged in the housing of the liquid ejection apparatus 10 and is refillable with the liquid from outside in the state of being arranged in the housing. In the meantime, the liquid tank 16 includes a colored plate provided with holes (hereinafter shortly referred to as a partition member 35). In the liquid tank 16, the liquid 33 can move between regions on both side of the partition member 35 through the holes provided therein. As shown in FIGS. 6 and 7, the partition member 35 is arranged to have a predetermined gradient from a bottom surface of the liquid tank 16 relative to the direction of the gravitational force (the vertical direction). In the example of FIGS. 6 and 7, a lower part of the partition member 35 is located at the bottom surface on the front surface side of the liquid tank 16 while an upper part of the partition member 35 is located at an upper surface at an intermediate part between the front surface and the rear surface of the liquid tank 16. Of the surfaces that constitute the liquid tank 16, the surface 38*a* opposed to the front surface of the liquid ejection apparatus 10 and a surface 38*c* opposed to the upper surface of the liquid ejection apparatus 10 are formed from transparent components having optical transparency, for example.

Figure 8A:
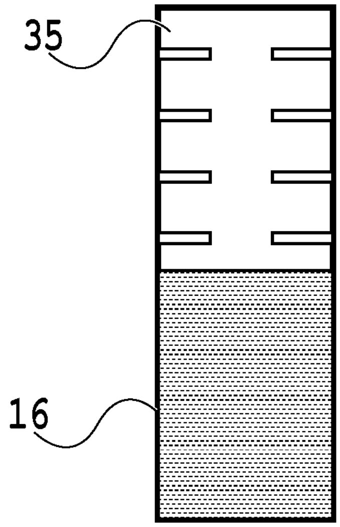
FIGS. 8A and 8B are diagrams showing how a liquid tank looks in a case where the liquid tank is observed from a front surface side and an upper surface side.
Figure 8B:
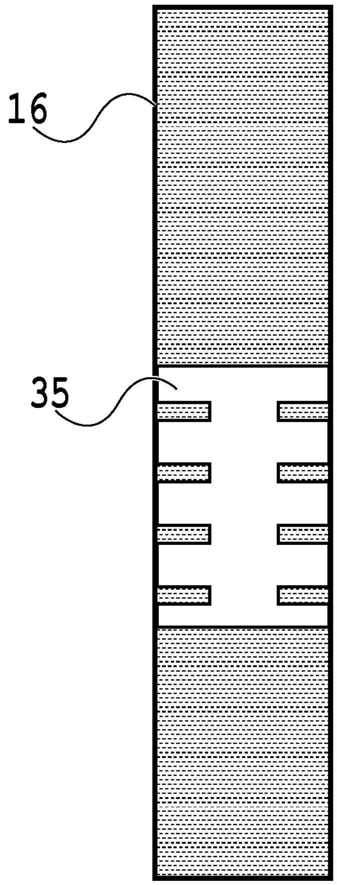

FIGS. 8A and 8B are diagrams showing how the liquid tank 16 shown in FIG. 7 looks in the case where the liquid tank 16 is observed from the front surface side and the upper surface side. Note that FIGS. 8A and 8B show how the liquid tank 16 looks in the case of observing the liquid tank 16 alone. In the case where the user observes the liquid tank 16 from the front surface, the user can visually recognize the remaining amount of the liquid 33 contained in the liquid tank 16 based on the observable area of the partition member 35 as illustrated in FIG. 8A. In other words, the user can visually recognize the remaining amount (the level of the liquid surface) of the liquid 33 by observing the liquid tank 16 from the front surface observation window 31 of the liquid ejection apparatus 10 that houses the liquid tank 16.

Meanwhile, in the case where the user observes the liquid tank 16 from the upper surface, the user can visually recognize the remaining amount of the liquid 33 based on the observable area of the partition member 35 as illustrated in FIG. 8B. In other words, the user can visually recognize the remaining amount (the level of the liquid surface) of the liquid 33 also in the direction from above by observing the liquid tank 16 from the upper surface observation window 32 of the liquid ejection apparatus 10 that houses the liquid tank 16.

Figure 9:
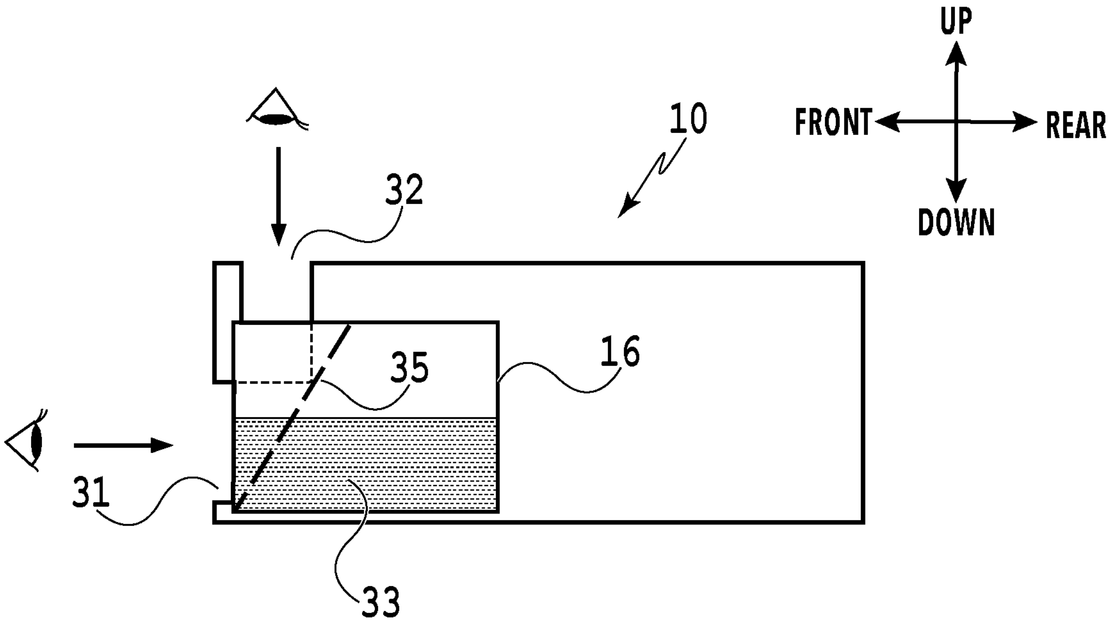
FIG. 9 is a diagram showing an example of changing a gradient of a partition member.

FIG. 9 shows an example of changing the gradient of the partition member 35 illustrated in FIG. 6. As shown in FIG. 9, the partition member 35 is installed in such a way as to pass through a point of intersection of an extension of the side that extends toward the liquid tank on an upper side of the front surface observation window 31 and an extension of the side that extends toward the liquid tank on a rear surface side of the upper surface observation window 32. As a consequence of installing the partition member 35 as described above, it is possible to achieve the same display of the remaining amount being visually recognizable by the user regardless of which observation window the user approaches for the observation.

Figures 10A, 10B:
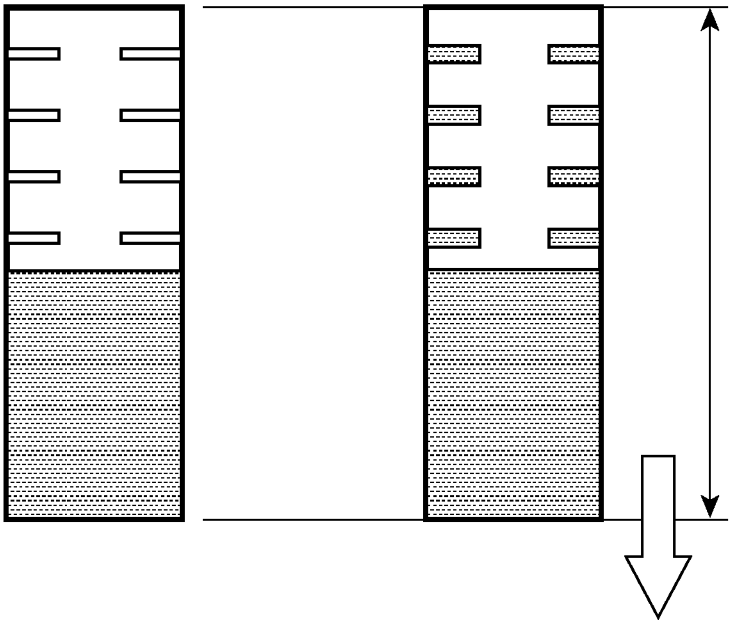
FIGS. 10A and 10B are diagrams showing how a liquid tank looks in a case where the liquid tank is observed through observation windows.

FIGS. 10A and 10B are diagrams showing how the liquid tank 16 looks in the case where the liquid tank 16 having the configuration shown in FIG. 9 is observed from the respective observation windows. FIG. 10A shows how the liquid tank 16 looks when the liquid tank 16 is observed from the front surface observation window 31, and FIG. 10B shows how the liquid tank 16 looks when the liquid tank 16 is observed from the upper surface observation window 32. As illustrated in FIGS. 10A and 10B, the area of the partition member 35 observable in the case of observation from the front surface observation window 31 is the same as the area of the partition member 35 observable in the case of observation from the upper surface observation window 32. This configuration is useful in a case where the user performs both the observation from the front surface and the observation from the upper surface.

Figure 11A:
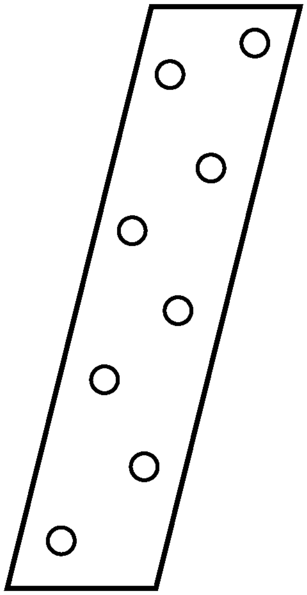
FIGS. 11A to 11C are diagrams showing various examples of the partition member.
Figure 11B:
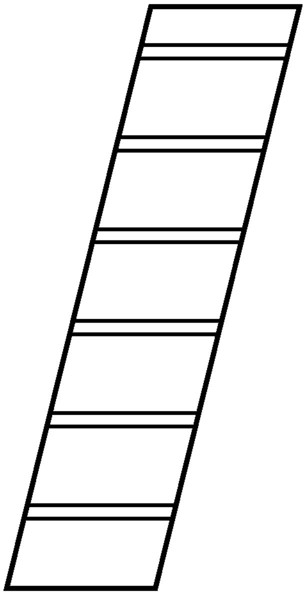
Figure 11C:
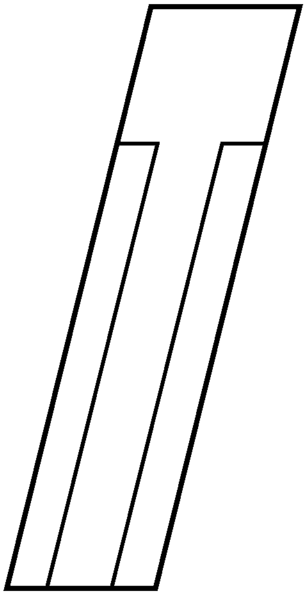

FIGS. 11A to 11C are diagrams showing various examples of the partition member. The partition member 35 only needs to be capable of allowing the liquid to communicating (passing) between the partitioned regions. In this regard, the shape of the partition member 35 is not limited to the shape illustrated in FIG. 7 and the like. The partition member 35 may be formed by dispersing circular holes as shown in FIG. 11A. The partition member 35 may be formed by providing linear holes as shown in FIG. 11B. The linear holes can also be used as a substitute for scales. Alternatively, the partition member 35 may be provided with holes on its side surfaces as shown in FIG. 11C. In the meantime, this embodiment has described the example in which the partition member 35 is formed into a straight plate. However, the partition member 35 is not limited only to this configuration. The partition member 35 may be a plate that is formed into a stepped shape like stairs or may be a curved plate. Meanwhile, the partition member 35 should be provided in such a way that the liquid can communicate between the regions partitioned by the partition member 35. In this context, side surfaces of the partition member 35 do not have to be in contact with the side surfaces of the liquid tank 16. In other words, the partition member 35 only needs to be such a component that defines the space where the liquid can communicate between the partitioned regions.

Meanwhile, FIG. 7 and the like have described the example in which the lower part of the partition member 35 is located at the bottom surface on the front surface side of the liquid tank 16 while the upper part of the partition member 35 is located at the upper surface at the intermediate part between the front surface and the rear surface of the liquid tank 16. However, the partition member 35 is not limited only this configuration. Specifically, the upper part of the partition member 35 may be located at the upper surface on the front surface side of the liquid tank 16 while the lower part of the partition member 35 may be located at the bottom surface at the intermediate part between the front surface and the rear surface of the liquid tank 16. In other words, the gradient of the partition member 35 may be inverted. In the meantime, the location to install the partition member 35 in the liquid tank 16 may be changed as appropriate depending on a relation between the front surface observation window 31 and the upper surface observation window 32. For example, if the upper surface observation window 32 is formed closer by a predetermined distance to the rear surface as compared to the location illustrated in FIG. 9, then the partition member 35 can also be provided closer to the rear surface by a predetermined distance away from the location illustrated in FIG. 9.

As described above, the visual recognition mechanism according to this embodiment includes the front surface observation window 31, the upper surface observation window 32, and the partition member 35 in the liquid tank 16. In this embodiment, the partition member 35 provided with the holes therein is disposed in the liquid tank 16. If the liquid tank 16 is observed from the front surface observation window 31 or the upper surface observation window 32 of the liquid ejection apparatus 10, the way how the partition member 35 looks varies depending on the remaining amount of the liquid 33. As a consequence, the user can visually recognize the remaining amount (the level of the liquid surface) in the liquid tank 16 depending on how the partition member 35 looks.

Other Embodiments

Each of the embodiments described above has explained the example in which the liquid ejection apparatus 10 is the printing apparatus. However, the liquid ejection apparatus 10 is not limited only to the printing apparatus. The embodiments are applicable to an apparatus of any type as long as the apparatus is designed to cause a user to check a remaining liquid amount and to refill the apparatus with a liquid as needed.

Meanwhile, the second and third embodiments have explained the example of installing one liquid tank in the liquid ejection apparatus 10. However, two or more liquid tanks may be installed instead. In this case, the respective liquid tanks are preferably arranged and installed such that the user can visually recognize the remaining amounts of the respective liquids from one of the front surface observation window 31 and the upper surface observation window 32. In the meantime, the gradient of the partition member 35 may be changed depending on the amount of the liquid contained in each of the liquid tanks.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-014824, filed Jan. 31, 2020, which is hereby incorporated by reference wherein in its entirety.

What is claimed is:

1. A liquid ejection apparatus comprising:

a housing at least including an upper surface and plural side surfaces which include a front surface;

a plurality of liquid tanks each being arranged in the housing and each being refillable with a liquid from outside;

an operating panel arranged on at least one of the side surfaces; and a plurality of display units each corresponding to a corresponding one of the plurality of the liquid tanks and each being configured to indicate a remaining liquid amount in the corresponding liquid tank, the plurality of display units being arranged flush to a chamfered surface which joins the upper surface to the front surface of the housing and which is a plane which extends across an entirety of the upper surface and the front surface, wherein the plurality of display units are arranged side by side along a direction in which the chamfered surface extends, wherein the display units are arranged along a direction of extension of the plane of the chamfered surface, and each of the display units has a shape extending in the direction in which the chamfered surface extends, and wherein the plurality of liquid tanks are invisible from outside of the housing in a state where the liquid tanks are arranged inside the housing to eject liquid.

2. The liquid ejection apparatus according to claim 1, wherein the display units are configured such that a length of an indicator to indicate the remaining liquid amount varies in the direction in which the chamfered surface extends in accordance with the remaining liquid amount.

3. The liquid ejection apparatus according to claim 2, wherein the display unit is a meter indicating the remaining amount by increasing and decreasing the meter using light emission using LEDs.

4. The liquid ejection apparatus according to claim 1, wherein a color corresponding to a color of the liquid targeted for indication of the remaining liquid amount is used in the corresponding display unit.

5. The liquid ejection apparatus according to claim 1, wherein the display units are arranged at the chamfered surface and wherein the operating panel is arranged on the front surface and includes an operating unit used to operate the liquid ejection apparatus.

6. The liquid ejection apparatus according to claim 1, wherein the display units are meters indicating the remaining amount by light emission using LEDs.

7. The liquid ejection apparatus according to claim 1, wherein the housing has no window or opening configured to make a remaining liquid amount in the liquid tank visible from outside of the housing.

8. The liquid ejection apparatus according to claim 1, wherein the chamfered surface extends over an entire width of the front surface of the housing.

9. The liquid ejection apparatus according to claim 8, wherein each of the display units is configured such that a length of an indicator to indicate the remaining liquid amount varies in the direction in which the chamfered surface extends in accordance with the remaining liquid amount corresponding to the liquid tank.

10. The liquid ejection apparatus according to claim 1, wherein the upper surface of the liquid ejection apparatus has a scanner.

11. The liquid ejection apparatus according to claim 1, wherein the plurality of the liquid tanks are four tanks, and four display units corresponding to the four tanks, respectively, are arranged in a line along the direction in which the chamfered surface extends across an entire width of the front surface of the housing.

12. The liquid ejection apparatus according to claim 1, wherein the display units are configured such that a length of an indicator to indicate the remaining liquid amount varies in the direction in which the chamfered surface extends in accordance with the remaining liquid amount.

13. The liquid ejection apparatus according to claim 1, wherein the plurality of display units are arranged side by side with a space in between each along the direction in which the chamfered surface extends, each of the display units having a length extending in the direction in which the chamfered surface extends, wherein each space between the display units is smaller than the lengths of the display units.

14. The liquid ejection apparatus according to claim 1, wherein in the direction in which the chamfered surface extends, a total length occupied by the plurality of the display units is larger than a length of the operating panel in the direction in which the chamfered surface extends.

* * * * *